3,244,682
POLYMERIZATION CATALYST AND
POLYMERIZATION PROCESS
Edward L. Czenkusch, John P. Hogan, Darrell W. Walker, and Geir Bjornson, Bartlesville, Okla., assignors to Phillips Petroleum Company, a corporation of Delaware
No Drawing. Filed May 7, 1963, Ser. No. 278,748
18 Claims. (Cl. 260—88.2)

The invention relates to a polymerization catalyst and a polymerization process. In one aspect this invention relates to an improved vanadium-containing catalyst and a method of preparing same. In another aspect this invention relates to polymerizing olefins using said catalyst.

Various vanadium-containing compounds have been tested as polymerization catalysts in the prior art but, in general, their effectiveness as catalysts has been very low. In some instances the addition of various other catalytic materials such as hydrides, organometals, and alkali metals have produced complex catalyst systems of increased effectiveness, but even so the results obtained leave much to be desired. However, in U.S. Patent 3,018,255, issued January 23, 1962, to R. L. Banks, there is disclosed and claimed a valuable and useful process for polymerizing ethylene to normally solid polymers wherein there is employed a relatively simple vanadium oxide catalyst.

In one aspect the present invention is an improvement over the invention of said Banks patent. We have discovered that the process of Banks can be improved by treating the catalyst with carbon monoxide prior to employing it in the polymerization of ethylene and other 1-olefins for the production of normally solid polymers. The major improvement obtained is a marked increase in the yield of normally solid polymers. Prior art vanadium-containing catalysts when treated with reducing agents such as hydrogen, and subsequently employed in polymerizing 1-olefins, do not yield normally solid polymers. In view of the discouraging prior art experiences with the treatment of catalysts of this type with reducing agents such as hydrogen, the fact that normally solid polymers are obtained when employing the catalyst of this invention was entirely unexpected. Indeed, it was surprising that any solid polymer was obtained at all.

Thus, broadly speaking, the present invention resides in our discovery of novel vanadium-containing catalysts which are useful in the polymerization of 1-olefins to normally solid polymers, methods of preparing said catalysts, methods of employing said catalysts in the polymerization of 1-olefins to normally solid polymers, and normally solid polymers produced by said polymerization processes. Broadly speaking, the catalysts of our invention are prepared by depositing a vanadium-containing compound on a suitable support and activating the resulting composite by treating same with carbon monoxide.

An object of this invention is to provide an improved vanadium-containing catalyst. Another object of this invention is to provide a method of preparing an improved vanadium-containing catalyst. Another object of this invention is to provide a method of polymerizing 1-olefins to normally solid polymers employing the improved vanadium-containing catalysts of the invention. Another object of this invention is to provide a normally solid polymer of a 1-olefin which is prepared by polymerizing said olefin in the presence of the improved vanadium-containing catalysts of the invention. Still another object of this invention is to provide a more active vanadium-containing catalyst. Another object of this invention is to provide a more efficient and more effective polymerization process whereby increased yields of normally solid polymers of 1-olefins are obtained. Other aspects, objects, and advantages of the invention will be apparent to those skilled in the art in view of this disclosure.

Thus, according to the invention, there is provided a process for preparing a vanadium-containing catalyst, suitable for use in a polymerization process for the production of a normally solid polymer of a 1-olefin, which process comprises: depositing a vanadium-containing compound which is capable of being converted to the oxide upon heating on a suitable solid support to form a composite; and treating said composite with carbon monoxide at a temperature and for a period of time sufficient to impart to the resulting catalyst increased catalytic activity for promoting the formation of a normally solid polymer of said olefin.

Further according to the invention, there is provided a process for polymerizing an aliphatic 1-olefin to a normally solid polymer, under polymerizing conditions, with a vanadium-containing catalyst prepared as described in the immediately preceding paragraph.

Still further according to the invention, there is provided an improved vanadium-containing catalyst which is prepared by the process comprising: depositing on a suitable solid support a vanadium compound convertible to the oxide upon heating to form a composite; and treating said composite with carbon monoxide at a temperature and for a period of time sufficient to impart increased catalytic activity for the formation of a normally solid polymer of a 1-olefin to said composite.

Still further according to the invention, there are provided normally solid polymers of 1-olefins, which polymers are prepared by contacting a 1-olefin under polymerizing conditions with a catalyst prepared as described in the immediately preceding paragraph.

The catalysts according to this invention comprise as a major component a suitable solid particulate support. The terms "support," "base" or "carrier" as used herein in connection with the catalyst are considered synonymous and are not to be narrowly construed. The support is not necessarily a mere inert component of the catalyst. Some supports apparently contribute part of the catalytic activity to the catalyst and, as set forth hereinafter, such supports are obviously the preferred supports for use in the practice of the invention. However, the carbon monoxide treatment of the invention provides improved catalysts regardless of the type of support which is utilized in the catalyst composite. Thus, the invention is not to be limited to those supports which may contribute part of the catalytic activity to the finished catalyst.

Catalyst supports which are useful in the practice of the invention include, among others, the following: silica, alumina, silica-alumina, kieselguhr, activated clay, charcoal, and the like. The most effective and presently preferred supports are silica, alumina, and silica-alumina, particularly silica-alumina in which the silica is in major proportion, preferably at least 75 weight percent of the support. A presently more preferred support is a silica-alumina support wherein the amount of silica is within the range of about 80 to about 95 weight percent with from about 5 to about 20 weight percent alumina. The particle size of the particulate support prior to impregnation with the vanadium-containing compound is relatively unimportant and can vary widely from about 0.01 micron average diameter particles to about 10 mesh (U.S. Sieve Series) material, or even larger. Both porous and non-porous supports can be utilized in the practice of the invention. The support material preferably has a surface area of at least 50 square meters per gram. During the catalyst preparation the support particles can sometimes agglomerate or break up to some degree. It is within the scope of the invention to adjust the particle size of the finished catalyst to any desired particle size by any suitable method such as comminution in a ball mill, etc., or to press the particulate catalyst into pellets of any desired size and shape. For mobile catalyst polymerization techniques the preferred particle size of the finished catalyst is within the range of about 50 to about 325 mesh (U.S. Sieve Series).

The catalysts of the invention should contain at least 0.1 but ordinarily not over about 10 weight percent vanadium, calculated as the metal. However, it is within the scope of the invention to employ catalysts of higher vanadium content. For maximum activity it is presently preferred that the vanadium content of the catalyst be in the range of from about 1 to about 5 weight percent of the total catalyst composite, calculated as the metal.

In preparing the catalysts of our invention, a vanadium-containing compound capable of being at least partially converted to an oxide upon heating is deposited or otherwise incorporated with the carrier or support. Any suitable method known in the art, such as impregnation, can be employed in preparing the catalyst. The support can be dipped, immersed, sprayed, or otherwise contacted with a dispersion, i.e., a solution or a suspension, of the vanadium-containing compound in a suitable solvent. In impregnating the support, the concentration of the impregnating solution, the amount thereof with respect to the amount of the support, and the time of contact of the impregnating solution with the support can be varied over a wide range to produce a catalyst having the desired vanadium content. The concentration will depend, to some extent, upon the particular impregnation technique employed. The concentration of the impregnating solution, the total amount of solution, and the time of contact of same with the support are usually adjusted to deposit from 0.1 to about 10 weight percent of vanadium (based on the metal) on the support. We have found that satisfactory results can be obtained when a solution having a concentration in the order of 0.5 to 5 molar with respect to the metal is utilized, the support is immersed in this solution, allowed to remain for a time in the order of 5 to 30 minutes, and the excess liquid then drained off. Another, and frequently preferred, method of impregnating a support is to prepare an impregnating solution of known concentration, admix a suitable portion of this with a known quantity of support, and evaporate the solvent from the mixture. By following this procedure it is possible to deposit on the support any given amount of vanadium compound. Following impregnation, the resulting catalyst composite is dried and treated further in accordance with the invention as described hereinafter.

Any suitable vanadium-containing compound which is convertible to the oxide upon heating can be utilized in the practice of the invention to impregnate the support material. Any suitable medium can be employed for dispersing the vanadium-containing compound prior to incorporating same with the support. The medium utilized should be capable of adequately dispersing said compound, be relatively volatile for removal of the medium from the support after impregnation, and be chemically inert under the conditions of impregnating the support, i.e., non-reactive with the vanadium-containing compound or the support under the conditions of impregnating said support and removing the excess medium after impregnation. Water is the presently preferred medium. However, examples of other suitable non-aqueous media include the various organic solvents including aliphatic hydrocarbons such as hexane, the isohexanes, heptane, octane, isooctane, cyclohexane, etc.; aromatic hydrocarbons such as benzene, toluene, xylene, etc.; the lower molecular weight alcohols such as methanol, ethanol, propanol, isopropanol, pentanol, etc.; lower molecular weight aldehydes such as acetaldehyde, propionaldehyde, etc.; the lower molecular weight ketones such as acetone, methyl ethyl ketone, etc.; lower molecular weight organic esters such as methyl acetate, ethyl acetate, ethyl benzoate, etc.; and lower molecular weight organic acids such as acetic acid, propionic acid, etc. and mixtures of two or more of the above solvents. Any of said media and mixtures thereof can be employed provided it is chemically inert as described, can be conveniently removed from the support by evaporation after the impregnation has occurred, and will disperse the particular vanadium compound which it is desired to utilize.

Since water is the presently preferred dispersing medium for the vanadium-containing compound, the more preferred vanadium-containing compounds are those which are readily dispersible in water. A presently preferred group are the water soluble salts of inorganic and organic acids. These include, among others, the following: vanadium oxalate, vanadium malonate, vanadium acetate, vanadium citrate, vanadium chlorides, vanadyl chloride, ammonium vanadate, and the like. Other vanadium-containing compounds which are soluble or dispersible in one or more of the above organic solvents, and which are preferably employed when it is desired to utilize non-aqeuous medium in the impregnation of the support, include, among others, the following: dibenzene vanadium, dicumene vanadium, dicyclopentadienyl vanadium, vanadium acetylacetonate, and other vanadium chelates of beta diketones such as 2,4-hexanedione, 3,5-heptanedione, 2,4-octanedione, 1-phenyl-1,3-butanedione, 8,10-heptadecanedione, and the like.

The catalysts of our invention can be prepared in any of a number of suitable methods, provided always that the catalyst is treated with carbon monoxide at a temperature and for a period of time sufficient to activate the catalyst prior to employing it in the production of normally solid polymers. This treatment with carbon monoxide is the final step in the preparation of the catalyst. Said carbon monoxide treatment is usually carried out at a temperature within the range of from 550 to 1300, preferably 800 to 1300° F., for a period of time within the range of from 1 to 200 minutes, preferably 15 to 100 minutes. Said treatment with carbon monoxide can be carried out in any suitable manner known to the art for treating particulate materials with a gaseous medium. For example, said treatment may be carried out with the catalyst arranged in the form of fixed bed through which a stream of carbon monoxide or carbon monoxide containing gas is passed. Alternatively, and frequently preferable, fluidized bed techniques are employed for treating the catalyst with the carbon monoxide. It is sometimes preferred to carry out the treatment with a carbon monoxide which has been diluted, e.g., containing up to about 90 volume percent of an inert diluent gas such as nitrogen. After the carbon monoxide treatment the finished catalyst is cooled and then stored, preferably under dried nitrogen, until used.

In one method for preparing a catalyst in accordance with the invention, the support material is preactivated by treating same with an oxygen-containing gas, such as air, at a temperature within the range of from 800 to 1600, preferably 900 to 1400° F. for a period of time within the range of 0.5 to 50, preferably 2 to 20 hours. If desired, but not presently preferred, the treatment with the oxygen-containing gas can be followed with treatments with an inert gas such as nitrogen or a reducing gas such as hydrogen. Said preactivation treatment can be carried out in any known manner such as by employing the fixed bed and fluidized bed techniques mentioned above.

In order not to undo the effects of said preactivation step, the impregnation of the support is carried out utilizing a non-aqeuous medium and a vanadium-containing compound which is dispersible in said medium. Suitable media for this purpose have been described above. The impregnation can be carried out utilizing any suitable conventional technique. After the impregnation the impregnated support can be dried by any suitable method such as contacting with a stream of warm gas, indirect heating with combustion gases, heating in an electric oven or furnace, or by utilizing infrared irradiation. The drying can be carried out at any suitable temperature ranging from room temperature up to about 350° F. More usually, however, said drying is conducted at a temperature in the range of about 212 to 350° F. Ordinarily, a period of about 2 to 4 hours is sufficient for the drying step. Drying in vacuum at the above-described temperatures can be utilized if desired. After the drying step the catalyst is treated with carbon monoxide as described above.

In another method for preparing a catalyst in accordance with the invention, a dispersion, preferably an aqueous solution, of a suitable vanadium-containing compound which is convertible to the oxide upon calcining is utilized to impregnate the support material. The impregnated support is then dried as described above. Following the drying step, the dried catalyst composite is then given an activation treatment with an oxygen-containing gas, such as air, at a temperature within the range of from 800 to 1600, preferably 950 to 1400° F., for a period of time within the range of from 0.5 to 50, preferably 2 to 20 hours. Said activation treatment can be carried out in any suitable manner, such as the above-described fixed bed and fluidized bed techniques.

It should be noted that in one of the above-described methods for preparing a catalyst in accordance with the invention the support material was preactivated by treatment with an oxygen-containing gas whereas in the other described method the support was not preactivated. Generally speaking, it is preferable, but not essential, to preactivate the support when a nonaqueous dispersion is being utilized to impregnate the support material. Similarly, it is preferable, but not essential, to employ the above-described activation treatment with an oxygen-containing gas after the impregnation step when an aqueous dispersion has been utilized to impregnate the support material. In other words, with most supports, it is only essential to deposit the vanadium-containing compound on the support material, and then treat the resulting catalyst composite with carbon monoxide as described above in order to obtain improved catalysts in accordance with the invention. If desired, the drying step can be incorporated with the carbon monoxide treating step by initiating the carbon monoxide treatment at low temperatures, such as room temperature, and then gradually increasing the temperature of the treating gas to the ranges given above for the carbon monoxide treatment.

The catalysts prepared in accordance with our invention can be utilized for the conversion of aliphatic 1-olefins to normally solid polymers which are useful wherever solid polymers of olefins generally are employed. Thus, the polymers produced in accordance with the invention can be shaped into various objects such as bottles, tumblers, and the like. Said polymers can also be drawn to form strong fibers or can be fabricated into films which can be utilized in the packaging art.

Olefins which are polymerizable to normally solid polymers in accordance with our invention include, in general, ethylene, propylene, mixtures of ethylene and propylene in all proportions, and mixtures of a major amount of ethylene with a minor amount of up to 25 mol percent of the monomer mixture of at least one other 1-olefin monomer having from 4 to 8 carbon atoms per molecule. Diolefins, e.g., butadiene and isoprene, are included as 1-olefins which are polymerizable to normally solid polymers over our improved catalysts. Examples of other 1-olefins include, among others, 1-butene, 1-pentene, 4-methyl-1-pentene, 1-hexene, 1-heptene, and 1-octene.

The polymerization can be conducted with the monomer or monomers in liquid or in gaseous phase. It is often preferred that the monomer or monomers be utilized in admixture with an inert diluent. Suitable diluents which are preferred are the paraffinic and the cycloparaffinic hydrocarbons. Suitable hydrocarbons of this class are propane, isobutane, normal butane, isopentane, normal pentane, the isohexanes, normal hexane, cyclopentane, methylcyclopentane, cyclohexane, methylcyclohexane, and the dimethylcyclohexanes. Aromatic hydrocarbons, such as benzene, toluene and the xylenes can be utilized, but are ordinarily not preferred. The over-all concentration of olefin in the hydrocarbon feed to the reactor when a diluent is used can be within the range 1 to 20 weight percent, based on total hydrocarbon, although these limits are not absolute. The feed and withdrawal rates are preferably regulated so that the polymer concentration in the reaction zone is within the range of 1 to 20 weight percent. Any of the catalytic contacting techniques utilized in the prior art can be utilized in accordance with the invention. Numerous suitable techniques are explained in detail in U.S. Patent 2,825,721 (1958). Thus, the catalyst can be utilized in the form of a fixed bed, a fluidized dense bed, or a slurry in the diluent. When the catalyst is utilized in the form of a slurry, the concentration of catalyst in said slurry is ordinarily within the range 0.01 to 10 weight percent. The particle size of the catalyst in this slurry can suitably be within the range from about 20 mesh down to a few microns. When the slurry technique is used, a slurry of the catalyst in the diluent, e.g., cyclohexane, is continually passed to the reactor, as is a stream of the olefin or olefins to be polymerized. The reaction mixture within the reactor can be stirred mechanically or pneumatically. In a moving bed process the feed rate is usually about 2 to 6 v./v./hour with the olefin concentration in the range of 0.1 to 25 weight percent and the catalyst rate from 0.1 to 0.5 v./v./hour.

Suitable reaction conditions employed in the polymerization zone in accordance with our invention include a temperature within the range of from 150 to 450, preferably 150 to 350° F. When the monomer or monomers being polymerized are monoolefins, a more preferred temperature range is from 250 to 350° F. When the monomer or monomers being polymerized are diolefins, a more preferred temperature range is from 150 to 300° F.

The pressure in the polymerization zone can vary from atmospheric for vapor phase reactions to 700 p.s.i.g., or higher if desired. When a diluent is employed, the pressure is sufficient to maintain the diluent in the liquid phase and to dissolve sufficient of the monomer or monomers in the diluent. Generally speaking, the pressure will be within the range of from 0 to 2000 p.s.i.g., preferably 100 to 800 p.s.i.g. When the monomer or monomers being polymerized are monoolefins, the pressure is more preferably maintained within the range of from 200 to 800 p.s.i.g. When the monomer or monomers being polymerized are diolefins, the pressure is more preferably maintained within the range of from 75 to 700 p.s.i.g.

The reaction time can vary within wide limits, depending to a large extent upon the temperature which is employed. Generally speaking, the reaction time will be within the range of from 0.1 to 25, preferably within the range of from 0.5 to 10 hours. When the monomer or monomers being polymerized are monoolefins, the reaction time will generally be within the range of from 0.1 to 5, preferably 0.5 to 3 hours. When the monomer or monomers being polymerized are diolefins, a more preferred range for the reaction time is from 1 to 10 hours.

The amount of catalyst employed in the reaction zone can also vary within wide limits. Generally speaking, the amount of catalyst employed will be within the range of from 0.01 to 50 weight percent, preferably 0.1 to 30 weight percent based on the monomer or monomers present. When the monomer or monomers being polymerized are monoolefins, the amount of catalyst utilized will generally be within the range of from 0.01 to 20, preferably 0.1 to 15 weight percent of the total monomer or monomers present.

The solid polyethylene is formed either as a deposit on the catalyst or in solution in the liquid diluent and can be recovered from solution by precipitation, such as by cooling the solution or by evaporating the solvent. Ordinarily the catalyst is filtered from the solution before precipitation but in certain applications, for example, when the polymer is to be pigmented with carbon black, the catalyst can be allowed to remain in the solid polymer. When no diluent is employed in the polymerization, the solid polymer can be recovered from the catalyst by extraction with a suitable solvent.

The catalysts of the invention can be regenerated by contact with an oxidizing gas such as air, which can be diluted with an inert gas. The removavl of organic material by combustion is preferably followed by an activation treatment with an oxygen-containing gas as previously described herein. After said activation step, the catalyst is then treated with carbon monoxide as described above to complete the regeneration.

Advantages of this invention are illustrated by the following examples. The reactants, and their proportions, and other specific conditions are presented as being typical and should not be construed as limiting the invention unduly.

EXAMPLE I

A vanadium-containing catalyst was prepared. A commercial silica-alumina (87 wt. percent silica:13 wt. percent alumina) was first preactivated by heating at 1000° F. for 20 hours in dry air, 1 hour in dry nitrogen, and 2 hours in dry hydrogen utilizing the fluidized bed technique. Said silica-alumina had a bulk density of approximately 0.5 gram per cc., an average particle size of about 80 microns, a surface area of about 450 square meters per gram, and a pore diameter of about 90 angstroms. A solution of 2.217 grams vanadium acetylacetonate in 25 cc. cyclohexane was slurried with 14.72 grams of the above activated silica-alumina. The mixture was allowed to stand overnight. The solvent was then removed by evaporation at reduced pressure and the catalyst composite was charged into a nitrogen purged activating tube. The composite was then heated for 30 minutes at 1000° F. in the presence of carbon monoxide utilizing the fluidized bed technique. The catalyst was then cooled and stored under dry nitrogen until use.

A 4.757 gram quantity of the above prepared catalyst (containing 1.83% vanadium) was charged into a previously warmed and nitrogen purged bench scale polymerization reactor of about 1-liter capacity together with 0.5 lb. cyclohexane diluent. The reactor was sealed and ethylene was admitted to a pressure of 450 p.s.i.g. The stirrer was started and heat applied. During the reaction the pressure was maintained at 450 p.s.i.g. by admitting ethylene as required. The reaction was allowed to continue for 1 hour at about 280° F. The reactor was then vented and 40.3 grams (after drying) solid polymer was recovered (by evaporation of the diluent) for an indicated polymerization rate of 8.5 lb. polymer/lb. catalyst/hr. A polymer from a run similar to this one had an inherent viscosity of 4.17.

This example shows that the vanadium catalysts of the invention are effective catalysts for the polymerization of 1-olefins to normally solid polymers.

EXAMPLE II

Another catalyst composite was prepared in essentially the same manner as in Example I except that an air activation treatment was substituted for the carbon monoxide treatment. A 11.95 gram quantity of the same silica-alumina (previously preactivated by treating same at 1000° F. for 20 hours with air, for 0.5 hour with nitrogen, and for 2 hours with hydrogen) was impregnated with a solution of 3.63 grams vanadium acetylacetonate in 25 cc. of cyclohexane. After solvent removal, the composite was heated to 900° F. in nitrogen in an activating tube, cooled to 200° F., and the fluidizing gas changed to air. The composite was then heated at 1000° F. for 0.5 hour in the presence of air. The catalyst was then cooled and stored in the presence of nitrogen until use.

A 2.37 gram quantity of the above prepared catalyst (containing 3.32% vanadium) was then used in a polymerization run similar to Example I. After a reaction period of 1 hour at 400 p.s.i.g. and 280° F. only a trace of solid polymer was observed within the reactor.

Comparison of the results of this example with the results of the above Example I shows the effectiveness of the carbon monoxide treatment in activating the catalyst for the production of normally solid polymer.

EXAMPLE III

A sample of the same commercial silica-alumina (87:13) as in Example I was impregnated with an aqueous solution of vanadyl chloride resulting in a composite which contained, after drying and calcining with air about 2 weight percent vanadium (calculated as the metal). The calcination was carried out at 1400° F. for 5 hours. A portion of the air treated catalyst was then treated with carbon monoxide gas in a fluidized bed for 30 minutes at 800° F.

A 0.485 gram portion of the above prepared catalyst was sealed in a glass ampule and placed in a 1-liter polymerization reactor. The reactor was heated to about 270° F. and flushed with dry nitrogen for about 10 minutes. A 0.75 lb. quantity of polymerization grade cyclohexane was charged, the ampule was broken, the reactor was sealed, ethylene was admitted, and the stirrer started. The reaction was allowed to continued for 1 hour at 290° F. during which the pressure was maintained at 490 p.s.i.g. After this period the reactor was vented, and 6.2 grams (after drying) of solid polymer was recovered by evaporation of the cyclohexane diluent. The calculated polymerization rate was 12.7 lb. polymer/lb. catalyst/hr.

EXAMPLE IV

Another portion of the calcined vanadium-containing composite prepared in Example III was treated with carbon monoxide in a fluidized bed for 60 minutes at 900° F. A 0.34 gram quantity of the treated catalyst was then employed, in a manner similar to that of Example III, to polymerize ethylene for 1 hour at 288° F. and 470 p.s.i.g. A 12 gram quantity of solid polymer was recovered, indicating a productivity rate of 35 lb. of polymer/lb. of catalyst/hour.

EXAMPLE V

As a control run to show the activity of the same catalyst without the carbon monoxide treatment, the same catalyst as was employed in Example IV, except that the carbon monoxide treatment was omitted, was employed in a polymerization run to polymerize ethylene under essentially the same conditions. A productivity rate of only 1.8 lb. of solid polymer/lb. of catalyst/hour was obtained.

EXAMPLE VI

A vanadium-containing silica-alumina composite was prepared in a manner similar to that of Example III except that the impregnating solution was an aqueous solution of ammonium vanadate. The catalyst composite containing 2 weight percent vanadium (calculated as the metal) was air activated 5 hours at 1000° F. and then treated with carbon monoxide for 100 minutes at 900° F. in the same manner as described in Example III.

In a polymerization run to polymerize ethylene, carried out in essentially the same manner as in Example III, a 0.414 gram portion of the catalyst produced 21.7 grams of solid polymer in 70 minutes at 300° F. and 475 p.s.i.g. The indicated productivity was 45 lb. of solid polymer/lb. of catalyst/hour.

EXAMPLE VII

A vanadium-containing catalyst was prepared as follows: a 12 gram quantity of vanadium basic acetate was dispersed in 140 ml. deionized water and 60 ml. concentrated nitric acid. Except for a small portion which remained undissolved, the vanadium acetate dissolved to form a dark green solution. The resulting dispersion was used to contact 80 cc. of a microspheroidal silica after which the resulting impregnated solid was dried in a vacuum oven. Said microspheroidal silica had a bulk density of about 0.45 gram per cc., an average particle size of about 80 microns, a surface area of about 650 square meters per gram, and a pore diameter of about 60 angstroms. Upon drying, the particulate solid turned a yellow-brown color. The dried catalyst composite was then treated with air for 18 hours at 950° F., and then treated with a stream of gas containing 23 volume percent CO and 77 volume percent $N_2$ at 575° F. for 25 minutes.

A 2.601 gram portion of the thus prepared catalyst was employed as the catalyst in a polymerization run wherein 1 lb. of isoprene was charged to a 1-liter bench scale polymerization reactor. The reaction was continued for 2 hours at 200° F. and about 90 p.s.i.g. At the end of this period, the reactor was vented and the contents were dried by evaporation. A 1.9 gram quantity of solid polymer was obtained.

EXAMPLE VIII

Another vanadium-containing catalyst was prepared substantially as described above in Example VII except that a finely divided non-porous silica (Cab-O-Sil) was employed as the support instead of the microspheroidal silica. Said non-porous silica had an average particle size of about 0.03 micron, a surface area of about 200 square meters per gram, and a bulk density of about 0.05 gram/cc. After air activation for 18 hours at 950° F. the catalyst composite was separated into several portions and each portion was subjected to a 20 minute carbon monoxide treatment (using a gas containing 23 volume percent CO–77 volume percent $N_2$) at varying temperatures. The resulting catalysts treated in this manner were tested in a series of simultaneous isoprene polymerization runs. Said polymerization runs were carried out by placing the catalyst and isoprene charge in heavy glass bottles and rotating the bottles at room temperature for 24 hours under substantially atmospheric pressure. The effect of different carbon monoxide treatment temperatures is shown in the following table in terms of the amount of solid polymer produced per unit weight catalyst.

*Table I*

| Run No. | Temp. (° F.) CO Treatment | Lb. Solid polymer/lb. catalyst |
| --- | --- | --- |
| 1 | (¹) | 1.3 |
| 2 | 300 | 0.74 |
| 3 | 600 | 3.5 |
| 4 | 900 | 7.5 |
| 5 | 1,050 | 9 |
| 6 | 1,200 | 5.5 |

¹ No treatment.

While certain embodiments of the invention have been described for illustrative purposes, the invention obviously is not limited thereto. Various other modifications will be apparent to those skilled in the art in view of this disclosure. Such modifications are within the spirit and scope of the invention.

We claim:

1. A process for the preparation of a catalyst consisting essentially of vanadium oxide on a support, suitable for use in a polymerization process to produce a normally solid polymer of a 1-olefin, which process comprises: depositing a vanadium compound capable of being at least partially converted to an oxide upon heating on a particulate support to form a catalyst composite; and treating said composite with carbon monoxide as the sole activating agent at a temperature within the range of from about 550 to about 1300° F. for a period of time sufficient to impart to the resulting catalyst increased catalytic activity for promoting the formation of a normally solid polymer of said olefin.

2. A process for the preparation of a catalyst consisting of vanadium oxide on a support, suitable for use in a polymerization process to produce a normally solid polymer of a 1-olefin, which process comprises: contacting a particulate support material with a dispersion, in an inert solvent, of a vanadium compound, capable of being at least partially converted to an oxide on heating, to form a catalyst composite; and treating said composite with carbon monoxide as the sole activating agent at a temperature within the range of from about 550 to about 1300° F. for a period of time sufficient to impart to the resulting catalyst increased catalytic activity for promoting the formation of a normally solid polymer of said olefin.

3. A process for the preparation of a catalyst consisting essentially of vanadium oxide on a support, suitable for use in a polymerization process for the production of a normally solid polymer of a 1-olefin, which process comprises: impregnating a particulate carrier material with an aqueous solution of a vanadium compound capable of being at least partially converted to an oxide upon heating; drying said impregnated carrier material; and treating said dried impregnated carrier material with carbon monoxide as the sole activating agent at a temperature within the range of from 550 to 1300° F. for a period of time within the range of from 1 to 200 minutes.

4. A process for the preparation of a catalyst consisting essentially of vanadium oxide on a support, suitable for use in a polymerization process to produce a normally solid polymer of a 1-olefin, which process comprises: impregnating a particulate support material with a solution, in an inert non-aqueous solvent, of a vanadium compound capable of being at least partially convertible to an oxide upon heating, drying said impregnated support; and treating said dried support with carbon monoxide as the sole activating agent at a temperature within the range of from 550 to 1300° F., for a period of time within the range of from 1 to 200 minutes.

5. A process for the preparation of a catalyst consisting essentially of vanadium oxide on a support, suitable for use in a polymerization process to produce a normally solid polymer of a 1-olefin, which process comprises: preactivating a particulate support material selected from the group consisting of silica, alumina, and silica-alumina by heating same in an oxygen-containing atmosphere at a temperature in the range of from 800 to 1600° F. for a period of time within the range of from 0.5 to 50 hours; impregnating said preactivated support material with a solution, in an inert non-aqueous solvent, of a vanadium compound capable of being at least partially converted to an oxide on heating; drying said impregnated support; and treating said dried impregnated support with carbon monoxide treating gas free of hydrogen and other reducing agents at a temperature within the range of from 550 to 1300° F. for a period of time within the range of from 1 to 200 minutes.

6. A process for the preparation of a catalyst consisting essentially of vanadium oxide on a support, suitable for use in a polymerization process to produce a normally solid polymer of a 1-olefin, which process comprises: impregnating a particulate support material with an aqueous solution of a vanadium compound capable of being at least partially converted to an oxide on heating; drying said impregnated support; treating said dried impregnated support with an oxygen-containing gas at a temperature within the range of from 800 to 1600° F. for a period of time within the range of from 0.5 to 50 hours; and then treating said impregnated support with carbon monoxide as the sole activating agent at a temperature within the range of from 550 to 1300° F. for a period of time within the range of from 1 to 200 minutes.

7. A process according to claim 6 wherein: said support material is silica-alumina; and said vanadium compound is vanadyl chloride.

8. A process according to claim 6 wherein: said support material is silica-alumina; and said vanadium compound is ammonium vanadate.

9. A process according to claim 6 wherein: said support material is silica; and said vanadium compound is vanadium basic acetate.

10. A process according to claim 5 wherein: said support material is silica-alumina; and said vanadium compound is vanadium acetylacetonate.

11. A catalyst consisting essentially of vanadium oxide deposited on a particulate support, having increased activity for the production of a normally solid polymer of a 1-olefin, prepared by: depositing a vanadium compound capable of being at least partially convertible to an oxide upon heating on a particulate support to form a catalyst composite; and treating said composite with carbon monoxide as the sole activating agent at a temperature within the range of from about 550 to about 1300° F. for a period of time sufficient to impart to the resulting catalyst increased catalytic activity for promoting the formation of a normally solid polymer of said olefin.

12. A catalyst consisting of vanadium oxide deposited on a particulate support, having increased activity for the production of a normally solid polymer of a 1-olefin, prepared by: preactivating a particulate support material selected from the group consisting of silica, alumina, and silica-alumina by heating same in an oxygen-containing atmosphere at a temperature in the range of from 800 to 1600° F. for a period of time within the range of from 0.5 to 50 hours; impregnating said pre-activated support material with a solution, in an inert non-aqueous solvent, of a vanadium compound capable of being at least partially converted to an oxide on heating; drying said impregnated support; and treating said dried impregnated support with carbon monoxide treating gas free of hydrogen and other reducing agents at a temperature within the range of from 550 to 1300° F. for a period of time within the range of from 1 to 200 minutes.

13. A catalyst consisting essentially of vanadium oxide deposited on a particulate support, having increased activity for the production of a normally solid polymer of a 1-olefin, prepared by: impregnating a particulate support material with an aqueous solution of a vanadium compound capable of being at least partially converted to an oxide on heating; drying said impregnated support; treating said dried impregnated support with an oxygen-containing gas at a temperature within the range of from 800 to 1600° F. for a period of time within the range of from 0.5 to 50 hours; and then treating said impregnated support with carbon monoxide as the sole activating agent at a temperature within the range of from 550 to 1300° F. for a period of time within the range of from 1 to 200 minutes.

14. A catalyst consisting essentially of vanadium oxide deposited on a particular support, having increased activity for the production of a normally solid polymer of a 1-olefin, prepared by: impregnating a particulate carrier material with an aqueous solution of a vanadium compound capable of being at least partially convertible to an oxide upon heating; drying said impregnated carrier material; and treating said dried impregnated carrier material with carbon monoxide as the sole activating agent at a temperature within the range of from 550 to 1300° F. for a period of time within the range of from 1 to 200 minutes.

15. A catalyst consisting essentially of vanadium oxide deposited on a particulate support, having increased activity for the production of a normally solid polymer of a 1-olefin, prepared by: impregnating a particulate support material with a solution, in an inert non-aqueous solvent, of a vanadium compound capable of being at least partially convertible to an oxide upon heating; drying said impregnated support; and treating said dried support with carbon monoxide treating gas free of hydrogen and other reducing agents at a temperature within the range of from 550 to 1300° F., for a period of time within the range of from 1 to 200 minutes.

16. A process for the production of a normally solid polymer, which process comprises: contacting under polymerizing conditions, an olefin selected from the group consisting of ethylene, propylene, mixtures of ethylene and propylene, butadiene, isoprene, and mixtures of a major amount of ethylene with a minor amount of up to 25 mol percent of the mixture of at least one other 1-olefin having from 4 to 8 carbon atoms per molecule, with a catalyst consisting essentially of vanadium oxide on a particulate support prepared by depositing a vanadium compound capable of being at least partially convertible to an oxide upon heating on a particulate support to form a catalyst composite; and treating said composite with carbon monoxide as the sole activating agent at a temperature within the range of from about 550 to about 1300° F. for a period of time sufficient to impart to the resulting catalyst increased catalytic activity for promoting the formation of a normally solid polymer of said olefin; and recovering the normally solid polymer so produced.

17. A process for the production of a normally solid polymer, which process comprises: contacting under polymerizing conditions, an olefin selected from the group consisting of ethylene, propylene, mixtures of ethylene and propylene, butadiene, isoprene, and mixtures of a major amount of ethylene with a minor amount of up to 25 mol percent of the mixture of at least one other 1-olefin having from 4 to 8 carbon atoms per molecule, with a catalyst consisting essentially of vanadium oxide on a particulate support prepared by preactivating a particulate support material selected from the group consisting of silica, alumina, and silica-alumina by heating same in an oxygen-containing atmosphere at a temperature in the range of from 800 to 1600° F. for a period of time within the range of from 0.5 to 50 hours; impregnating said preactivated support material with a solution, in an inert non-aqueous solvent, of a vanadium compound capable of being at least partially converted to an oxide on heating; drying said impregnated support; and treating said dried impregnated support with carbon monoxide treating gas free of hydrogen and other reducing agents at a temperature within the range of from 550 to 1300° F. for a period of time within the range of from 1 to 200 minutes; and recovering the normally solid polymer so produced.

18. A process for the production of a normally solid polymer, which process comprises: contacting under polymerizing conditions, an olefin selected from the group consisting of ethylene, propylene, mixtures of ethylene and propylene, butadiene, isoprene, and mixtures of a major amount of ethylene with a minor amount of up to 25 mol percent of the mixture of at least one other 1-olefin having from 4 to 8 carbon atoms per molecule, with a catalyst consisting essentially of vanadium oxide on a particulate support prepared by impregnating a particulate support material with an aqueous solution of a vanadium compound capable of being at least partially converted to an oxide on heating; drying said impregnated support; treating said dried impregnated support with carbon monoxide as the sole activating agent at a temperature within the range of from 800 to 1600° F. for a period of time within the range of from 0.5 to 50 hours; and then treating said impregnated support with carbon monoxide at a temperature within the range of from 550 to 1300° F. for a period of time within the range of from 1 to 200 minutes; and recovering the normally solid polymer so produced.

References Cited by the Examiner
UNITED STATES PATENTS

| | | | |
|---|---|---|---|
| 2,692,259 | 10/1954 | Peters | 260—88.1 |
| 2,728,757 | 12/1955 | Fields et al. | 260—94.9 |
| 3,010,948 | 11/1961 | Fields et al. | 260—88.2 |
| 3,018,255 | 1/1962 | Banks | 252—455 |

JOSEPH L. SCHOFER, *Primary Examiner.*